United States Patent [19]

Martin

[11] Patent Number: 4,555,836
[45] Date of Patent: Dec. 3, 1985

[54] METHOD OF MAKING A PROTOTYPE FROM CONCEPT DRAWINGS

[76] Inventor: Ronald C. Martin, 4634 Ashburton Pl., Sterling Heights, Mich. 48077

[21] Appl. No.: 576,511

[22] Filed: Feb. 2, 1984

Related U.S. Application Data

[63] Continuation-in-part of Ser. No. 544,032, Oct. 24, 1983, Pat. No. 4,474,722.

[51] Int. Cl.$^4$ ............................................. B21D 39/00
[52] U.S. Cl. ........................................ 29/428; 29/460; 434/88
[58] Field of Search ................. 29/407, 428, 458, 460; 434/82, 87, 88, 296; 273/348; 446/88; 428/314.2

[56] References Cited

U.S. PATENT DOCUMENTS

| | | |
|---|---|---|
| 2,351,891 | 6/1944 | Weisbaum ........................ 273/348 |
| 2,366,652 | 1/1945 | Rieger .................................. 446/88 |
| 2,770,072 | 11/1956 | Bast ....................................... 446/88 |
| 3,064,365 | 11/1962 | Ganine ................................ 434/82 |
| 3,459,274 | 8/1969 | MacPhail, Sr. ............. 428/314.2 X |
| 3,556,886 | 1/1971 | Reusser . |
| 3,629,388 | 12/1971 | Wolf et al. . |
| 3,685,110 | 8/1972 | Randolph, Jr. . |
| 3,788,372 | 1/1974 | Terenzoni . |
| 4,262,717 | 4/1981 | Kohn . |
| 4,401,496 | 8/1983 | Koontz, Jr. . |

OTHER PUBLICATIONS

Article entitled "Centaur a Unique Combination of Components for a Sports/Racing Car", Road & Track Magazine, May 1963, pp. 70–72.

*Primary Examiner*—Howard N. Goldberg
*Assistant Examiner*—Leonard S. Selman
*Attorney, Agent, or Firm*—Cullen, Sloman, Cantor, Grauer, Scott & Rutherford

[57] ABSTRACT

A method of making prototype vehicles by first building a skeletal body of interlocking substantially rigid templates on a frame. The frame is built of tubing members and panels to precise specifications and is fitted with wheels to facilitate transporting the prototype. The templates are then traced on polystyrene foam pattern pieces which are sized to fill the spaces between the templates. The pattern pieces are then attached to the frame and shaped to the design contour surface. The surface is then removed to a predetermined depth in two steps and filled with a hardenable material, such as an epoxy resin based pliable material. After the hardenable material cures, the prototype is surface sanded, primed, painted and fitted with trim pieces and hardware.

10 Claims, 13 Drawing Figures

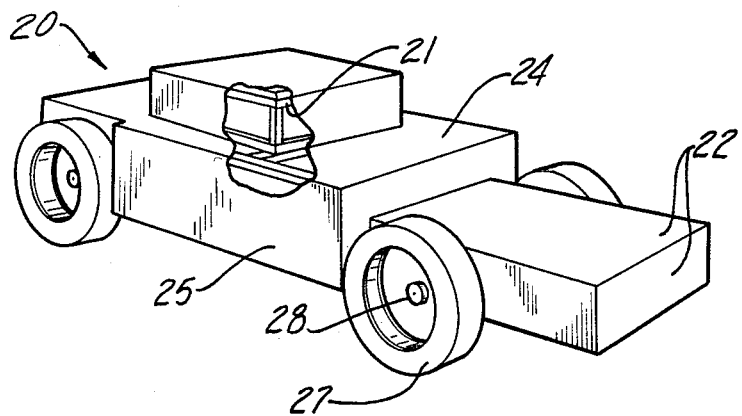
*Fig-2*
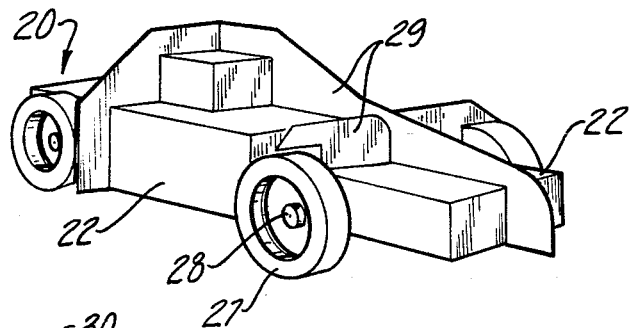
*Fig-3*
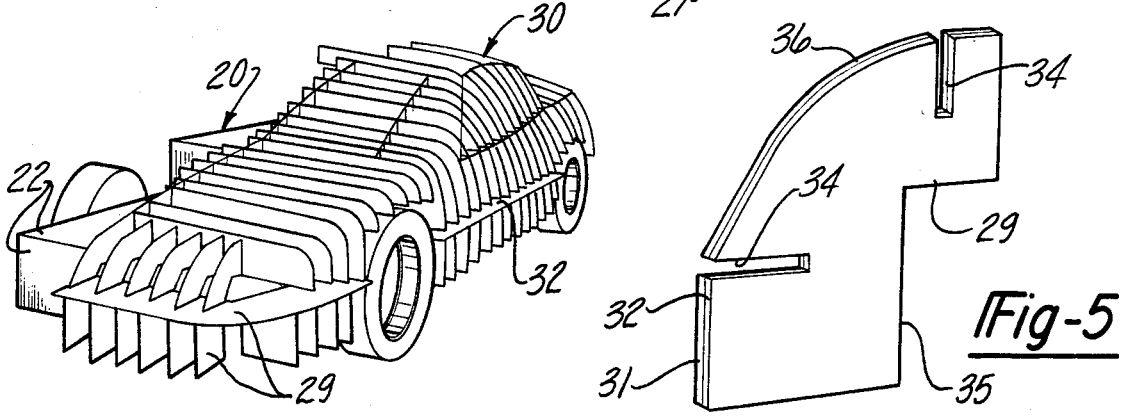
*Fig-4*  *Fig-5*
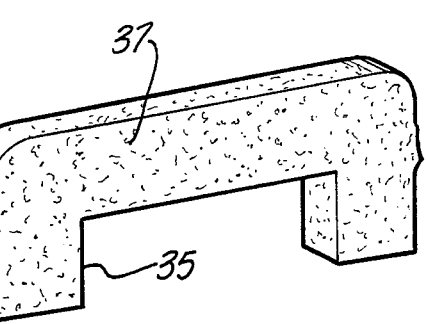
*Fig-6*

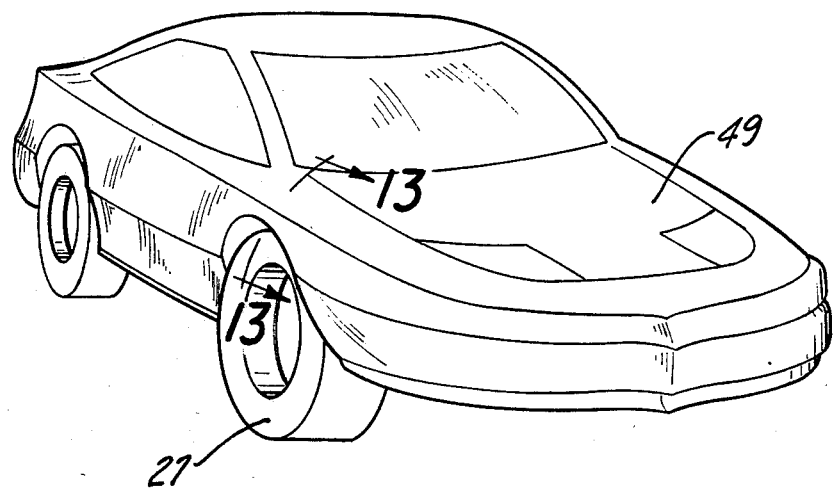
Fig-11
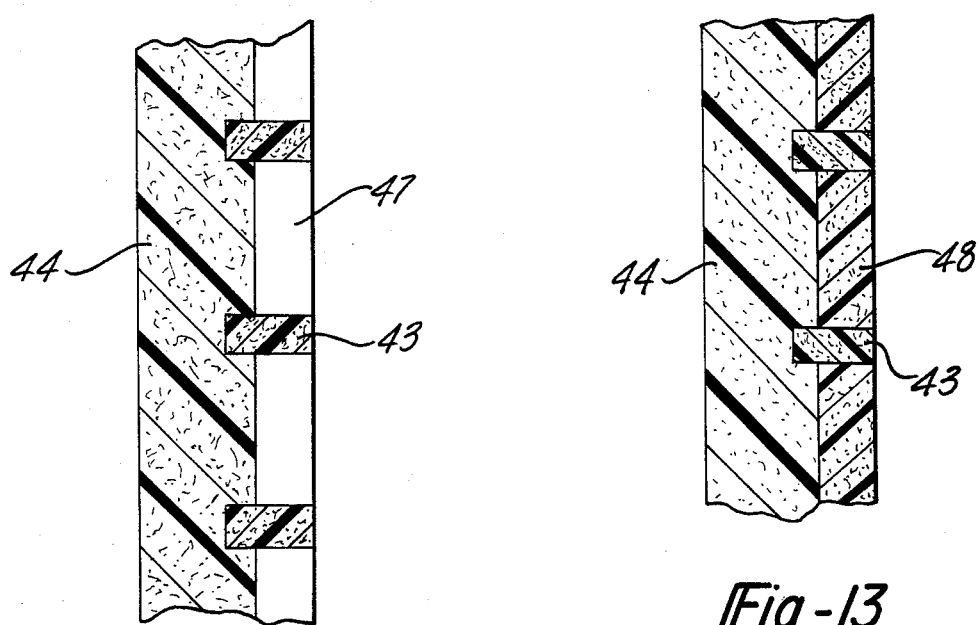
Fig-12
Fig-13

METHOD OF MAKING A PROTOTYPE FROM CONCEPT DRAWINGS

CROSS REFERENCE TO RELATED APPLICATION

This application is a continuation-in-part of my application Ser. No. 544,032 filed Oct. 24, 1983, now U.S. Pat. No. 4,474,722.

TECHNICAL FIELD

The present invention relates to a method of making intermediate patterns and prototypes of automobile bodies or other products.

BACKGROUND OF THE INVENTION

The conventional method of making a prototype automobile body is to first sculpt the body in modeler's clay. Skilled industrial sculptors transform body prints, drawings of a concept vehicle and/or verbal directions into a full-size three dimensional model. Modeling clay has long been used for its ability to be worked and reworked until the desired design is achieved. However, the ability to rework the styling clay also permits substantial variations from the initial concept to be incorporated in the final model. While a clay model may be studied to get a general idea of the design, it is still necessary to visualize the final appearance of the car without paint or trim.

Due to the large investment required in developing a new automotive or other product design, it is preferable to be able to evaluate a new design as it will finally appear, complete with realistically appearing paint and trim. When a clay styling model is made it can not be painted or trimmmed but is used as a pattern for a plaster or plastic cast mold. After a mold of the clay model is formed, fiberglass is then cast in the mold to the shape of the original clay model. The fiberglass body is then removed from the mold and finished by painting and assembling final trim and glass to permit evaluation of the product in its final form. The above process typically takes from three to four months and is extremely costly. If the final model is not satisfactory it may be necessary to push back production plans to permit the preparation of another clay model and fiberglass casting.

An example of a sports car body fabricating method is disclosed in an article entitled "Centaur", *Road & Track Magazine*, May 1963, pages 70-2. The Centaur body is made of glass fiber reinforced plastic that was molded from a mockup pattern made of polystyrene foam blocks fitted between plywood bulkheads. The mock up pattern is sculpted in polystyrene foam which is covered with a hard surfacer before making a mold for the polystyrene foam body.

Another alternative to the conventional clay modeling method is known as the epowood process wherein plywood panels are attached to a welded steel frame. According to the epowood process a plywood armature is assembled to precise specifications on a surface plate. Polystyrene foam blocks are then bonded to the armature and are covered with a thick layer of an epoxy resin base material. The epoxy resin base material is shaped to a rough body contour and then marked with horizontal body lines which are transferred from the drawing by placing a plan view template on the surface plate and tracing the outline of the template with a vertical angle block having a router attached thereto at a height corresponding to the horizontal body line of the plan view section to form a groove in the epoxy resin material. Making templates and grooving the epoxy resin material is repeated at vertically spaced intervals. After all of the grooves have been formed in the epowood material an industrial sculptor carves the remaining epoxy resin material to form a contoured surface interconnecting the grooves. The model may then be painted with a polyurethane paint and fitted with trim pieces as appropriate to complete the model.

Both of the processes outlined above are laborious procedures. The Centaur process requires making a mold of the covered polystyrene foam mock up pattern and formation of a fiberglass body. The epowood process requires preparation of complete body line drawings and templates as well as the use of an expensive surface plate for accuracy. In both methods the skills of an industrial sculptor are required in many phases of the procedure.

The above problems and other have been solved according to the method of the present invention.

SUMMARY OF THE INVENTION

The present invention relates to making a prototype pattern for a vehicle by first assembling a skeleton pattern made up of interlocked foam core panels. The foam core panels are traced from tapeline or other concept drawings and may be cut with a knife to the desired shape. The skeleton pattern permits viewing the concept vehicle as a full-size three dimensional model or pattern within a matter of days or even hours. The skeleton pattern may be easily modified by recutting the foam core sections until a satisfactory three dimensional pattern is obtained.

The foam core panels are then used as templates for cutting polystyrene foam blocks and as drawing stencils for design drawings. The polystyrene foam blocks, or blocks of easily formed material, are cut to the shape of the panels at both the body line contour and also on the base side so that the polystyrene foam blocks may be attached to a frame member. After the polystyrene foam blocks are attached to the frame member, the contoured surface is shaped with woodworking tools to the desired design contour.

When the polystyrene foam blocks are shaped to the desired design contour, a first portion of the contour surface is removed and filled with a pliable material which undergoes a reaction and hardens. A second portion of the contour surface is then removed and filled with more of substantially the same material and permitted to harden. The entire filled surface is then finish sanded, primed, painted and fitted with glass and other trim required to provide a prototype of show car quality which can be evaluated as an exact facsimile of the proposed product.

These and other advantages of the present invention will be better understood upon studying the following detailed description in view of the attached drawings.

BRIEF DESCRIPTION OF THE DRAWINGS

FIG. 2 is a perspective view of the frame, or cubed armature, upon which the prototype is built.

FIG. 3 is a perspective view of the frame with a few of the foam core sheets assembled thereto.

FIG. 4 is a perspective view of a skeletal model made up of interlocking foam core sheets.

FIG. 5 is a perspective view of a single foam core sheet.

FIG. 6 is a perspective view of a pattern piece.

FIG. 11 is a perspective view of the finished hard surface styling model with glass and other hardware assembled thereto.

FIG. 12 is a cross-sectional view taken along the lines 12—12 in FIG. 10.

FIG. 13 is a cross-sectional view taken along the line 13—13 in FIG. 11.

DETAILED DESCRIPTION OF A PREFERRED EMBODIMENT

Figure 1:
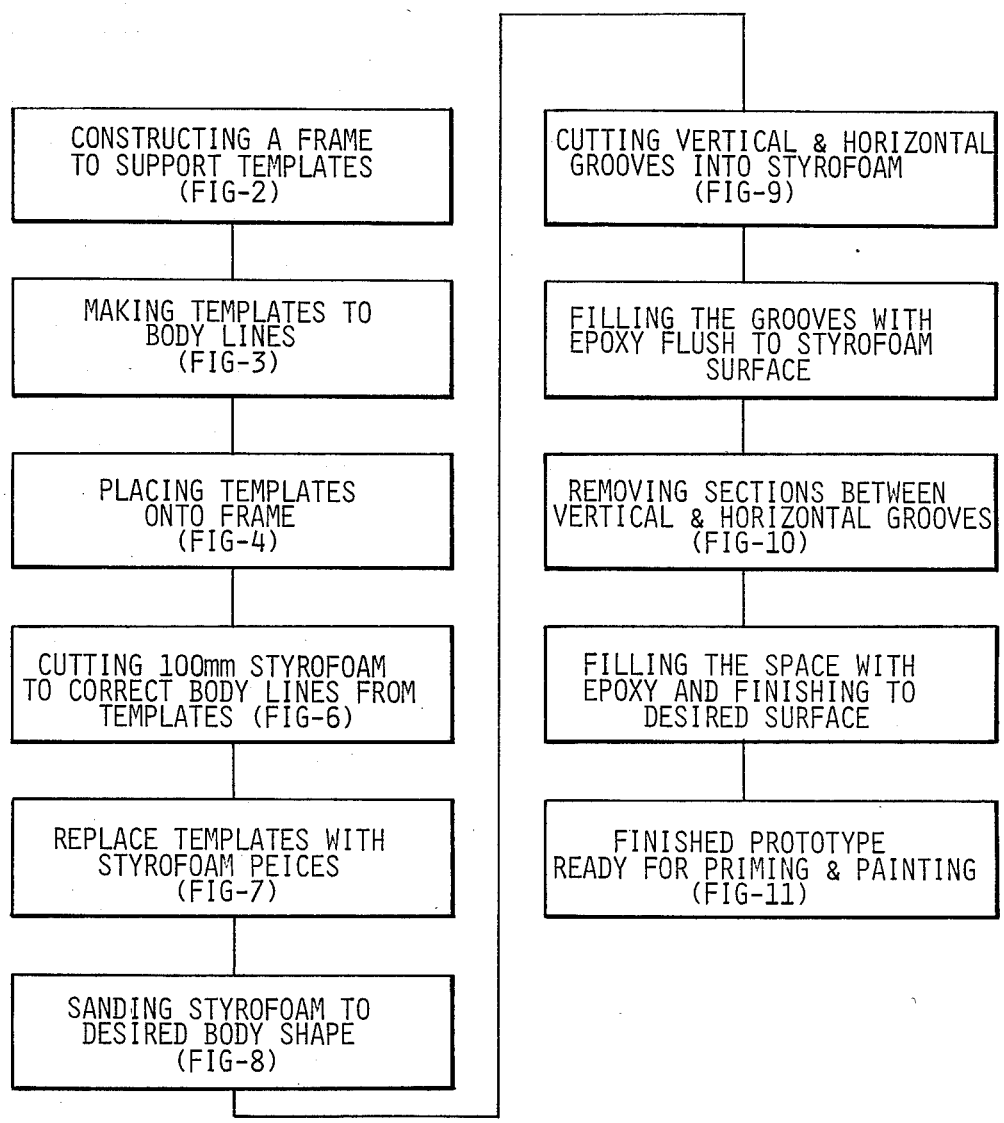
FIG. 1 is a block diagram showing the steps used in performing the disclosed method of making a prototype from concept drawings.

Referring now to FIG. 1, the basic steps of the process of making a prototype from design concept drawings are set forth schematically. The other figures are referenced on the schematic drawing where appropriate to permit easy understanding of the process. It should be understood that some of the steps may be supplemented with additional steps or that the order of some of the steps may be changed without deviating from the inventive concept.

Referring now to FIG. 2, a frame 20, or cubed armature, is shown to include tubular frame members 21 that are cut and assembled to form an accurate armature for supporting the prototype model. Plywood panels 22 are secured to the tubular frame members 21 to complete the construction of the frame 20. The panels 22 may also be fabricated from aluminum, steel or other rigid planar material. The frame 20 thereby defines horizontal and vertical surfaces 24 and 25 upon which the parts of the prototype model may be assembled. For ease of moving the prototype model, wheels 27 may be mounted on axles 28 that are journalled by the frame 20.

Referring now to FIGS. 3 and 4, the frame 20 is shown with a plurality of foam core sheets 29 assembled thereto. In FIG. 3 only a few of the sheets 29 are assembled to the frame to show the method by which the sheets are attached to the frame 20 with the frame acting as a reference point. In FIG. 4, many of the foam core sheets 29 are interlocked to form a skeletal model generally indicated by the reference numeral 30 from design concept drawings.

Referring now to FIG. 5 a foam core sheet 29 is shown to include a sheet of paper 31 which is laminated with a thin piece of polystyrene foam 32. The foam core sheets 29 are thin yet substantially rigid so as to maintain their shape and position when assembled together to form the skeletal model 30. The foam core sheets 29 have a plurality of slots 34 which permit interlocking the sheets together by interfitting the slots of intersecting sheets within one another. The sheets 29 are cut according to planar sections of drawings or tape line drawings by cutting a base edge 35 in the sheet 29 to engage the horizontal and vertical surfaces 24 and 25 of the frame 20. A contour edge 36 is traced from the outline of the planar sections taken from the drawings.

The sheets 29 are cut and then assembled to form the skeletal model shown in FIG. 4. After the skeletal model 30 has been assembled, the general shape of the skeletal model may be analyzed. If upon analysis of the skeletal model it is decided to change the shape of the skeletal model the sheets may be easily trimmed to refine and modify the model as required.

When the skeletal model is acceptable, the foam core sheets 29 are disassembled and pattern pieces 37, as shown in FIG. 6, may be cut out by tracing the contour edge 36 and base edge 35 in a block of polystyrene foam having a thickness corresponding to the interval between adjacent sheets 29 of the skeletal model 30.

Figure 7:
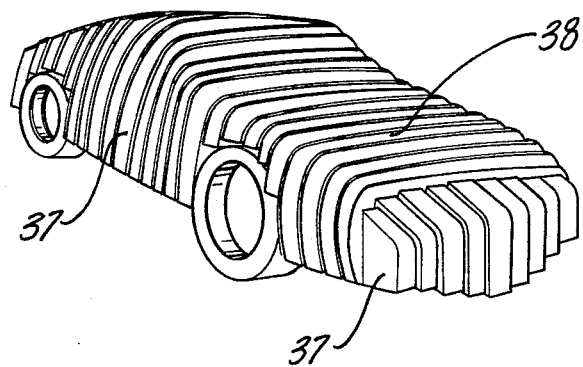
FIG. 7 is a perspective view of a series of pattern pieces assembled together to form a rough design pattern.

As shown in FIG. 7, when all of the pattern pieces 37 have been cut out they may be assembled to form a rough pattern 38 having a stepped surface. The pattern pieces 37 are bonded to one another and to the frame 20 to roughly define the shape of the prototype pattern. The rough pattern 38 is then shaped by shaving and sanding the rough pattern 38 with tools appropriate for shaping polystyrene foam, such as woodworking tools. The traced contour edge 36 of the pattern pieces 37 may be marked with a die or other pigmented substance to facilitate shaping of the rough pattern 38 into the prototype pattern 40 which corresponds to the contoured surface of the prototype.

The description of the method of shaping pattern pieces to a desired contour and the method of converting the pieces into a hard surface styling model in my prior co-pending patent application, U.S. Pat. No. 4,474,722 to Martin issued Oct. 2, 1984 filed Oct. 24, 1983, is incorporated herein by reference.

Figure 8:
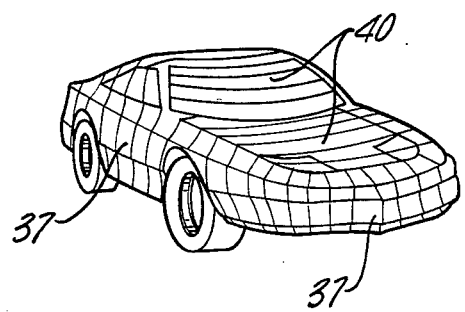
FIG. 8 is a perspective view of a prototype pattern corresponding to design concept drawings.

As shown in FIG. 8, the polystyrene foam prototype pattern 40 is shown with the design contour surface as it appears after shaping by shaving, sanding and other woodworking techniques.

Figure 9:
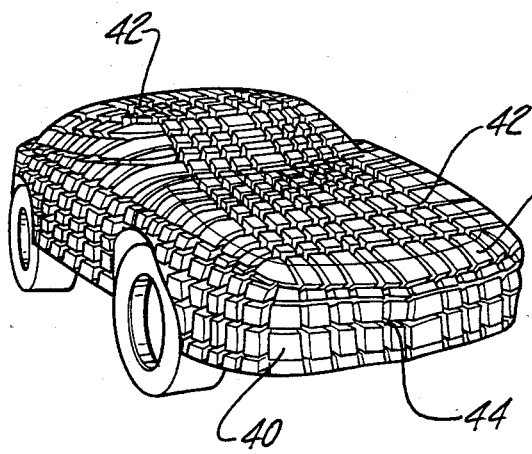
FIG. 9 is a perspective view of a prototype pattern having a first portion of the contour surface removed.

Referring now to FIG. 9 the prototype pattern 40 is shown with a first portion 42 of the contoured surface removed. The first portion 42 is then replaced with a pliable material which is formed into the first portion and undergoes a reaction wherein the material hardens. The preferred material is an epoxy resin type of material having glass microballoons which make the material clay-like in texture.

Figure 10:
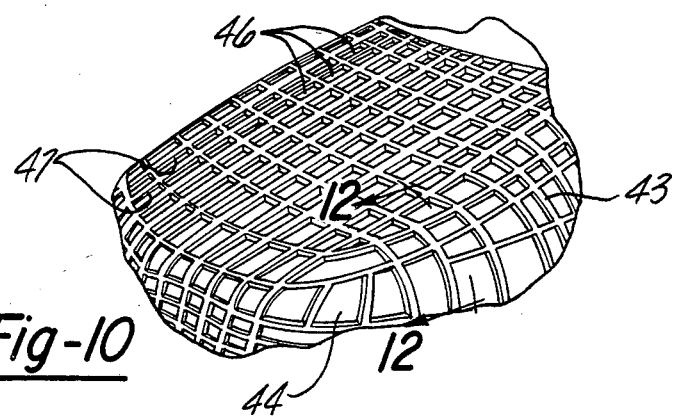
FIG. 10 is a fragmentary perspective view of a portion of the surface of a prototype pattern having a second portion of the pattern removed between filled grooves.

Referring now to FIG. 10, a second portion 46 of the contoured surface is removed leaving the upstanding ribs 43 of the hardened material that had been packed in the first portion 42 of the contour surface. Between the ribs 43 a surface of polystyrene foam is shown as a substrate 44 which remains after a second portion 46 of the contoured surface is removed leaving spaces 47 between the upstanding ribs 43. The relationship between the ribs 43, substrate 44, and spaces 47 may be seen more clearly by reference to FIG. 12.

The spaces 47 are next filled by preparing slabs 48 of the pliable material having a thickness slightly greater than the depth of the spaces 47 to provide a slightly protruding surface relative to the ribs 43. The slabs 48 are permitted to harden and are then sanded to the same contour as the prototype pattern 40 by sanding the slabs 48 down to the level of the ribs 43.

Referring now to FIG. 11, the hard surface prototype 49 is shown with trim and glass 51 assembled thereto. A cross-section of the surface is shown in FIG. 13 wherein the polystyrene substrate 44 supports the ribs 43 which are cut into the substrate 44 to an additional depth as compared to the slabs 48. The ribs 43 thereby anchor the slabs 48 into the substrate 44.

The hard surface prototype exhibits an extremely realistic appearance and may be assembled from tape line drawings and/or preliminary design drawings which thereby reduces the amount of preliminary design drafting required prior to building a prototype model. Design time is also saved according to the present invention by using the foam core sheets 29 as drawing templates to guide draftsmen in preparing body line drawings of a prototype model as the prototype model is being built or after approval of a prototype model.

While a preferred embodiment of the invention has been described to enable a person skilled in the art to practice the method of the present invention, the preceding description is intended to be exemplary and should not be used to limit the scope of the invention. The scope of the invention should be determined only by reference to the following claims.

What is claimed is:

1. A method of making a prototype pattern from design concept drawings comprising:
   constructing a frame;
   tracing and taking measurements from design concept drawings;
   cutting a plurality of thin sheets of substantially rigid material in accordance with planar sections of said drawings, said planar sections lying in a variety of orientations at specified intervals;
   assembling said sheets together and to the frame in the same orientation and at the same intervals as the planar sections of the drawings to form a skeletal model;
   disassembling the skeletal model into separate sheets;
   tracing the contour of the sheets on pattern pieces of easily shaped material, said pattern pieces being a thickness corresponding to the interval between adjacent sheets;
   assembling the pattern pieces together and onto the frame to form a rough design pattern; and
   shaping the rough design pattern to the desired contour of the prototype pattern.

2. A method of making a prototype from design concept drawings comprising:
   constructing a frame by assembling tubing members into at least one rectangular armature and attaching planar members to each vertical side and to the horizontal side of the armature;
   tracing and taking measurements from design concept drawings;
   cutting pattern pieces into shapes defined by the design concept drawings at known intervals;
   attaching the pattern pieces to the frame to form a rough design pattern having a stepped configuration;
   shaping the rough design pattern into a prototype pattern having a surface with the contour illustrated in the design concept drawings;
   removing a first portion of the surface of the prototype pattern, said first portion comprising a network spanning said surface;
   replacing said first portion with a pliable material that undergoes a reaction causing the material to harden;
   removing a second portion of the surface of the prototype pattern comprising the spaces between the first portion;
   replacing the second portion with a pliable material that undergoes a reaction causing the material to harden; and
   finishing the material after it hardens by sanding and painting the pliable material to form a hard surface suitable for priming, painting and attachment of trim.

3. According to the method of claim 2 wherein the prototype pattern is of a vehicle and includes the further step of attaching wheels to axles mounted on the armature.

4. A method of making a prototype from design concept drawings comprising:
   constructing a frame;
   tracing and taking measurements from design concept drawings;
   cutting a plurality of thin sheets of substantially rigid material in accordance with planar sections of said drawings, said planar sections lying in a variety of orientations at specified intervals;
   assembling said sheets together and to the frame in the same orientation and at the same intervals specified on the drawings to form a skeletal model;
   tracing the contour of the sheets on pattern pieces of easily shaped material, said pattern pieces being a thickness corresponding to the interval between adjacent sheets;
   assembling the pattern pieces together and onto the frame to form a rough design pattern;
   shaping the rough design pattern to a form prototype pattern having the design contour;
   removing a first portion of the surface of the prototype pattern;
   replacing said first portion with a hardenable material;
   removing a second portion of the surface of the prototype pattern comprising spaces between the first portion;
   replacing the second portion with a hardenable material; and
   finishing the hardenable material after it hardens by sanding and painting the clay-like material to create a prototype having a realistic appearance.

5. According to the method of claim 4 wherein said step of constructing a frame further comprises;
   securing a plurality of tubular frame members together to form at least one substantially rectangular armature; and
   fastening panels to the horizontal and vertical surfaces of the armature.

6. According to the method of claim 5 wherein the skeletal model is of a vehicle and includes the further step of attaching wheels to axles mounted on the armature.

7. According to the method of claim 4 wherein the thin sheets are foam core sheets comprising a thin piece of polystyrene foam attached to at least one sheet of cardboard.

8. According to the method of claim 4 wherein a first set of said planar sections extend in the longitudinal direction and a second set of said planar sections extend in the lateral direction.

9. According to the method of claim 4 further comprising the step of cutting slots partially through the sheets where two of said sheets intersect and said step of assembling said sheets together comprises interlocking said sheets together by interfitting the slots of intersecting sheets.

10. According to the method of claim 4 further comprising the steps of:
    analyzing the shape of the skeletal model; and
    trimming the sheets to refine and modify the shape of the skeletal model.

* * * * *